April 5, 1938.  H. D. GEYER  2,113,020
RESILIENT MOUNT FOR ELECTRIC MOTORS
Filed Sept. 12, 1935   2 Sheets-Sheet 1

INVENTOR
Harvey D. Geyer
BY
Spencer Hardman & Fehr
HIS ATTORNEYS

April 5, 1938. H. D. GEYER 2,113,020
RESILIENT MOUNT FOR ELECTRIC MOTORS
Filed Sept. 12, 1935 2 Sheets-Sheet 2

INVENTOR
Harvey D. Geyer
BY
Spencer Hardman & Fehr
HIS ATTORNEYS

Patented Apr. 5, 1938

2,113,020

UNITED STATES PATENT OFFICE 2,113,020

RESILIENT MOUNT FOR ELECTRIC MOTORS

Harvey D. Geyer, Dayton, Ohio, assignor to General Motors Corporation, Detroit, Mich., a corporation of Delaware Application September 12, 1935, Serial No. 40,226

1 Claim. (Cl. 248—26)

This invention relates to resilient mounts for electric motors.

An object of this invention is to provide an improved form or forms of resilient mounts for electric motors having the following features:

(1) The separately made mounting units comprise two relatively small and simply formed metal plates spaced apart by an intervening layer of resilient rubber bonded by vulcanization in situ to both metal plates. Thus these mounting units may be very efficiently manufactured at low cost.

(2) The mounts of this invention after they are separately made may be very simply installed upon the ends of the motor housing and have simple means thereon which will insure that when installed they will be properly axially aligned with the motor shaft and will properly support the weight of the suspended motor at all times.

(3) The mounts of this invention are relatively small in size and are so located on the outer ends of the motor housing as to render the motor bearings or motor commutator or brushes readily accessible for repairing, adjusting, or oiling when in use.

(4) The mount at the end of the motor from which the motor shaft projects is annular in form so as to permit the shaft to pass therethru and means are provided to shield the resilient rubber from harmful contact with any oil or other lubricant which ordinarily escapes from the closely adjacent shaft bearing.

(5) The mount at the end of the motor from which the motor shaft does not project completely overlies and seals the end of the shaft and bearing and thereby entirely prevents escape of lubricant oil at this end and hence fully protects the resilient rubber from deteriorating contact with the oil.

(6) The mounts at both ends of the motor and the attaching means therefore in no way interfere with the usual oil reservoirs for the motor shaft bearings since these mounts are fixed only to the outer vertical end walls of the housing and moreover are of relatively small diameter when the weight supporting area of rubber in shear is considered. The means for attaching the mount to the support bracket at the sealed end of the motor is a simple single threaded stud and nut therefor. The means for attaching the opposite end mount to the support bracket is a simple split ring clamp clamped upon the periphery of the mount proper. Thus the motor with the two rubber mounts assembled thereupon may be readily and quickly initially attached to the support bracket or removed therefrom for repairs or other reasons.

Further objects and advantages of the present invention will be apparent from the following description reference being had to the accompanying drawings wherein a preferred embodiment of the present invention is clearly shown.

In the drawings.

Similar reference characters refer to similar parts throughout the several views.

Figure 1:
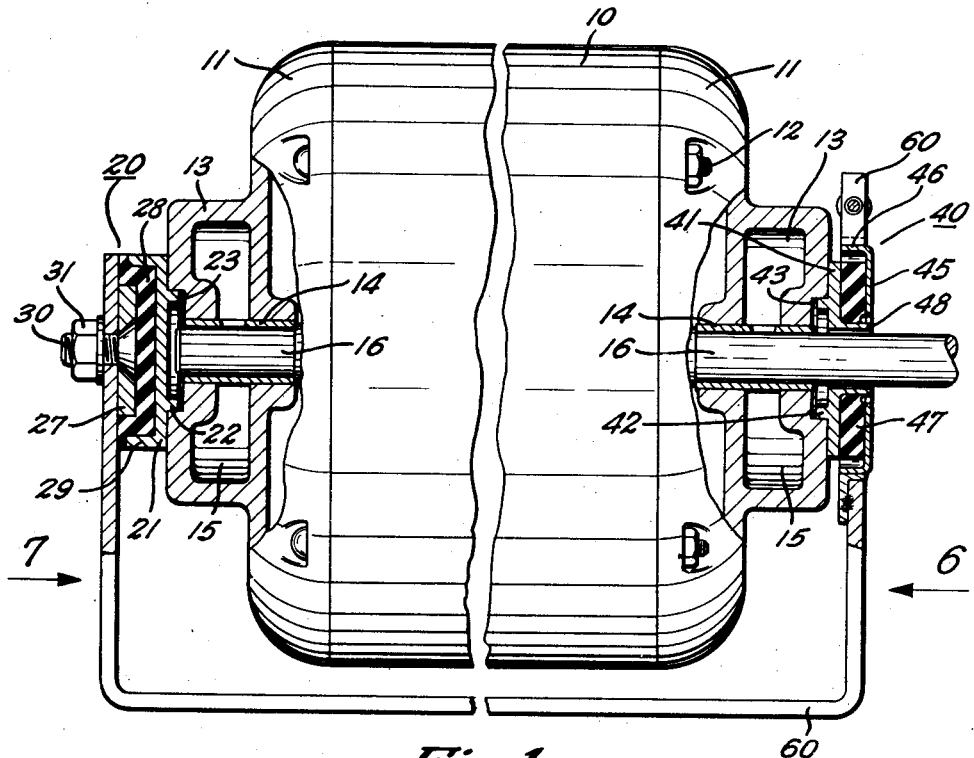
Fig. 1 shows an electric motor mounted upon the two resilient mounts of this invention, the two mounts and adjacent portions being shown in vertical section.

The motor housing 10 is shown as having cast end walls 11 which are bolted together by the thru-bolts 12. These cast end walls 11 are shown as having hollow integral portions 13 which serve to hold the two end bearing bushings 14 and form the oil reservoirs 15 of substantial size for properly lubricating the armature shaft bearings. Any desired form of oil ring or oil wick or other device may be used within chambers 15 for lifting or distributing the oil in the reservoirs to the bushings 14.

Figure 2:
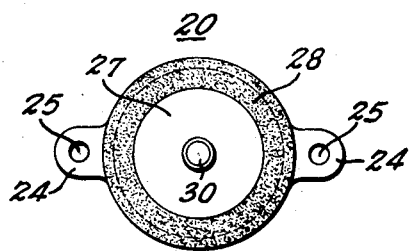
Figs. 2 and 3 are outer face view and side elevation respectively of the mount unit shown at the left side of Fig. 1.
Figure 3:
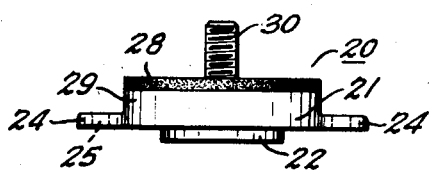

The resilient bearing mount unit 20, shown in Figs. 2 and 3, is rigidly fixed to the outer end wall of the housing portion 13 at the left side of Fig. 1 from which the armature shaft 16 does not project. This mount 20 comprises a metal base 21, preferably a malleable iron casting, having a concentric axially projecting annulus 22 which fits snugly into the shallow concentric recess 23 in the motor housing surrounding the end of the the shaft 16 and bushing 14. Base 21 is also preferably provided with lateral lugs 24 having holes 25 to receive machine screws or rivets 26 by means of which the base is rigidly fixed to the motor housing. A metal disk 27 somewhat smaller in diameter than base 21 forms the opposite metal plate of the mount unit and these two plates have an intervening resilient rubber layer 28 which is bonded by vulcanization in situ to both metal plates. This outer metal plate 27 has a central hole thru which a screw 30 is inserted and its head welded or otherwise fixed in place thereto prior to these parts being set in a vulcanizing mold for the vulcanization of the rubber body 28 thereto. Base 21 preferably has a peripheral flange 29 which encases the resilient rubber body 28 partially but not completely, and thus aids in supporting the resilient rubber body 28 against excessive distortion when in use but nevertheless does not interfere with the resilient non-metallic connection between the motor and its exterior support.

Figure 4:
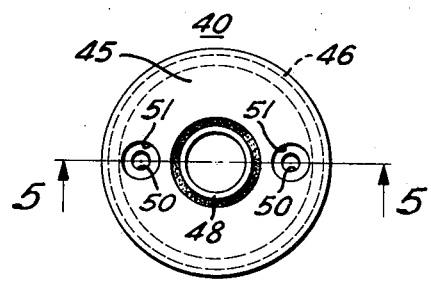
Figs. 4 and 5 are outer face view and cross section thru the mount unit shown at the right side of Fig. 1.
Figure 5:
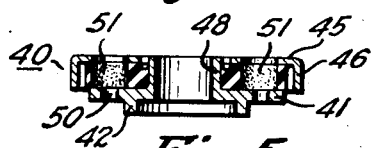
Figure 6:
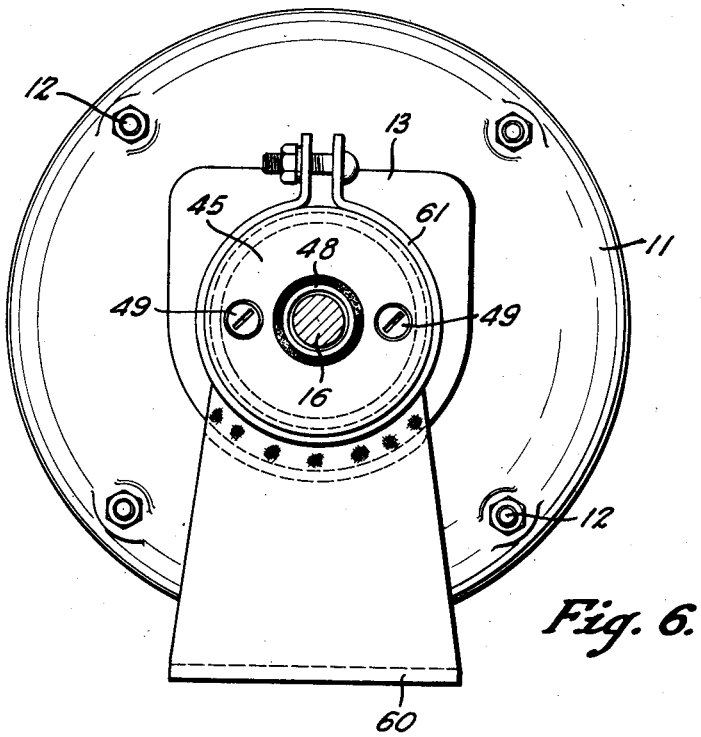
Fig. 6 is an end elevation looking in direction of arrow 6 of Fig. 1.
Figure 7:
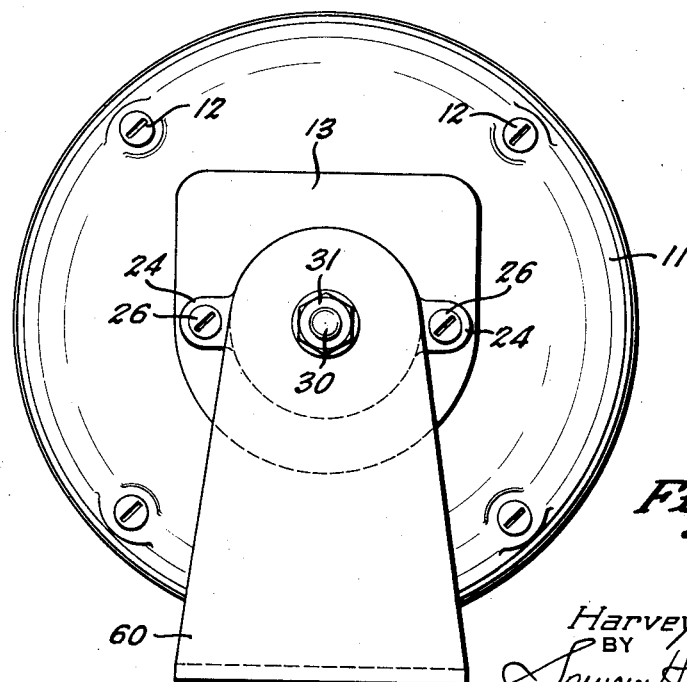
Fig. 7 is an end elevation looking in direction of arrow 7 of Fig. 1.

The resilient mount unit 40, shown in Figs. 4 and 5, is rigidly fixed to the outer end wall of housing portion 13 at the right side of Fig. 1. This mount 40 comprises an annular base 41 having a concentric axially projecting annulus 42 which fits snugly into the shallow concentric recess 43 in the motor housing surrounding the armature shaft 16. The opposite metal plate 45 has a peripheral flange 46 of slightly greater diameter than the intervening resilient rubber annulus 47 which is bonded by vulcanization in situ to both metal plates 41 and 45. Preferably the base plate 41 has an integral concentric sleeve portion 48 which has an inner diameter sufficiently large to clear the shaft 16. This sleeve 48 serves as a shield for protecting the resilient rubber 47 from any oil which normally escapes from the shaft bearing and which may be thrown off from the shaft by centrifugal force. Lubricating oil will cause rapid deterioration of resilient rubber. It will be clear from the drawings that the rubber element 47 is substantially protected from damage by oil by metal on all sides thereof, yet proper clearance is provided for the desired relative movement between plates 41 and 45. Plate 41 may be rigidly fixed to the motor housing by machine screws 49 inserted thru holes 50 therein (see Figs. 5 and 6). To permit insertion of these screws, concentric larger holes 51 are provided in the other plate 45 and the rubber 47 so that the screw heads may pass therethru and clamp directly against the metal plate 41. The outer plate 45 is held rigidly fixed to the exterior motor bracket 60 by a suitable clamping ring 61 surrounding the peripheral flange 46. It will now be clear that both of the disclosed mounts 20 and 40 can be very simply rigidly fixed to the end walls of the motor housing by two small screws each since the weight load is carried by the annular flanges 22 and 42. After these mounts 20 and 40 are fixed to the motor as above described, the motor assembly may be attached to the exterior support bracket 60 by the single axially projecting screw 30 and nut 31 at one end thereof, and by the split clamping ring 61 (clearly illustrated in Fig. 6) at the other end thereof.

While the embodiment of the present invention as herein disclosed, constitutes a preferred form, it is to be understood that other forms might be adopted, all coming within the scope of the claim which follows.

What is claimed is as follows:

In an electric motor, having an exterior housing and an armature shaft and shaft bearings supported at opposite ends of said housing, in combination a resilient mount located axially with said shaft and closely adjacent the end of one of said shaft bearings, said mount comprising: two axially spaced metal plates having a layer of resilient rubber therebetween and bonded thereto so as to carry the weight load by vertical shear in the rubber, the inner metal plate being fixed to the end wall of said housing and overlying and sealing the end of the adjacent shaft bearing and thereby protecting said resilient rubber layer from any oil or other lubricant used in said bearing.

HARVEY D. GEYER.